United States Patent [19]
Holm et al.

[11] Patent Number: 5,321,706
[45] Date of Patent: Jun. 14, 1994

[54] METHOD AND APPARATUS FOR CHECKING THE ADDRESS AND CONTENTS OF A MEMORY ARRAY

[75] Inventors: Ingemar Holm, Stuttgart; Helmut Kohler, Monsheim; Peter Mannherz, Schönaich; Norbert Schumacher, Neuhausen; Gerhard Zilles, Jettinger, all of Fed. Rep. of Germany

[73] Assignee: International Business Machines Corporation, Armonk, N.Y.

[21] Appl. No.: 719,456

[22] Filed: Jun. 24, 1991

[30] Foreign Application Priority Data

Jun. 27, 1990 [DE] Fed. Rep. of Germany ..... 90112210

[51] Int. Cl.$^5$ ............................................. G06F 11/00
[52] U.S. Cl. ................................. 371/51.1; 371/21.5; 371/49.1
[58] Field of Search .................... 371/21.2, 21.5, 40.4, 371/49.1, 51.1, 37.7

[56] References Cited

U.S. PATENT DOCUMENTS

| | | | |
|---|---|---|---|
| 4,692,893 | 9/1987 | Casper | 371/51 |
| 4,785,452 | 11/1988 | Petz et al. | 371/51.1 |
| 5,142,541 | 8/1992 | Kim et al. | 371/51.1 |

*Primary Examiner*—Vincent P. Canney
*Attorney, Agent, or Firm*—Bernard M. Goldman

[57] ABSTRACT

A circuit for checking the memory array address and contents is described. The circuit consists of at least one write address counter (120) and at least one read address counter (130). Before a data word is read into the array, each of its check bits are XORed with one bit of the address location at which the word is to be written. On reading out the word, the check bits are again XORed with the bits of the address location to restore their original value and the parity of the data word is checked. If the parity is found to be incorrect then it is known that an error has occurred either on reading in or reading out and the appropriate action can be taken.

9 Claims, 3 Drawing Sheets

FIG. 1 ced. Such a procedure is described in IBM Technical Disclosure Bulletin, 32 (3B), August 1989, pp 44, "Enhanced Processor Error Detection using Address Parity". These methods require extra circuitry to generate and check the parity of the address as well as extra storage space within the array to store the parity bit of the address together with the data word.

METHOD AND APPARATUS FOR CHECKING THE ADDRESS AND CONTENTS OF A MEMORY ARRAY

The invention relates to a method for checking the address and contents of a memory array as data is read into or read out of the array.

Prior Art

Prior methods for checking the address of a storage array generally involve the generation of a parity bit for the storage array address and storing this in the array together with the data word. When the data word is fetched at a later time, the parity can be checked by the processor and any discrepancies reported. Such a procedure is described in IBM Technical Disclosure Bulletin, 32 (3B), August 1989, pp 44, "Enhanced Processor Error Detection using Address Parity". These methods require extra circuitry to generate and check the parity of the address as well as extra storage space within the array to store the parity bit of the address together with the data word.

IBM Technical Disclosure Bulletin, 17(6), November 1974, pp 1645, "Address Circuit Checking" by Deuerlein et al. teaches a procedure to determine whether the correct information is read out from an address location. This is done by having two separate memory arrays and two separate address decoders. The data word is split in half and separate parity bits are calculated for each half word. The two half words are then stored in different memory arrays. The parity bits of each half word are stored in the other array i.e. the parity bit of the right word is stored in the left word array and vice versa. On reading the data out of the array, a check is made to see whether the parity is correct for each half word and a message issued if an error is detected. In this circuit, the success rate for error detection is, however, only 75%.

IBM Technical Disclosure Bulletin, 16(6), November 1973, pp 1763-1764, "Destination Checking of Memory Arrays" by HOWE et al describes a method of catching an address failure by storing the data in two different arrays. On a read command, the data is read out of the same address location in both arrays and compared using an exclusive OR circuit. Should an error have occurred this will be signaled if the data is different in each array. This arrangement of storage is, however, costly in that it requires the provision of two completely independent arrays.

A further method for improving data integrity by promptly detecting address errors within a memory system is disclosed in IBM Technical Disclosure Bulletin, 26(2), July 1983, pp 643-645, "Method/Apparatus for Improved Data Integrity" by Aichelman, Jr. In this system, alternate storage locations are assigned different data word formats so that an error can be detected if the data being read out of a particular location has the wrong format. This system requires means to convert the data into different formats as it is read into the storage array and further means for decoding it as it is read out. Such means add to the complexity of the system and still fail to detect errors when the expected data format is read out of an address location but whose contents are in fact in error.

SUMMARY OF THE INVENTION

The object of the invention is to provide a means to check the address of an array, to check the contents of the array and to check the whole of the addressing path to insure that the correct data is stored into and read out of the array. The invention saves logic and memory space by not requiring the generation of a parity bit for the address.

The invention achieves this object by having one counter to write data into the array and another separate counter to read the data out of the array. These should be synchronized to show the same array address at all times. On reading the data out of the array some bits from the data word are XORed with the address bits from the read counter and this altered data word is then stored. On reading out, the altered bits from the data word are XORed with the corresponding address bits from the write counter. If the read and write counter are operating in synchronism this should result in the altered bits in the data word returning to their original value. If this does not happen then it is clear that an error has occurred in either of the two counters or within the array.

DETAILED DESCRIPTION OF THE INVENTION

Figure 1:
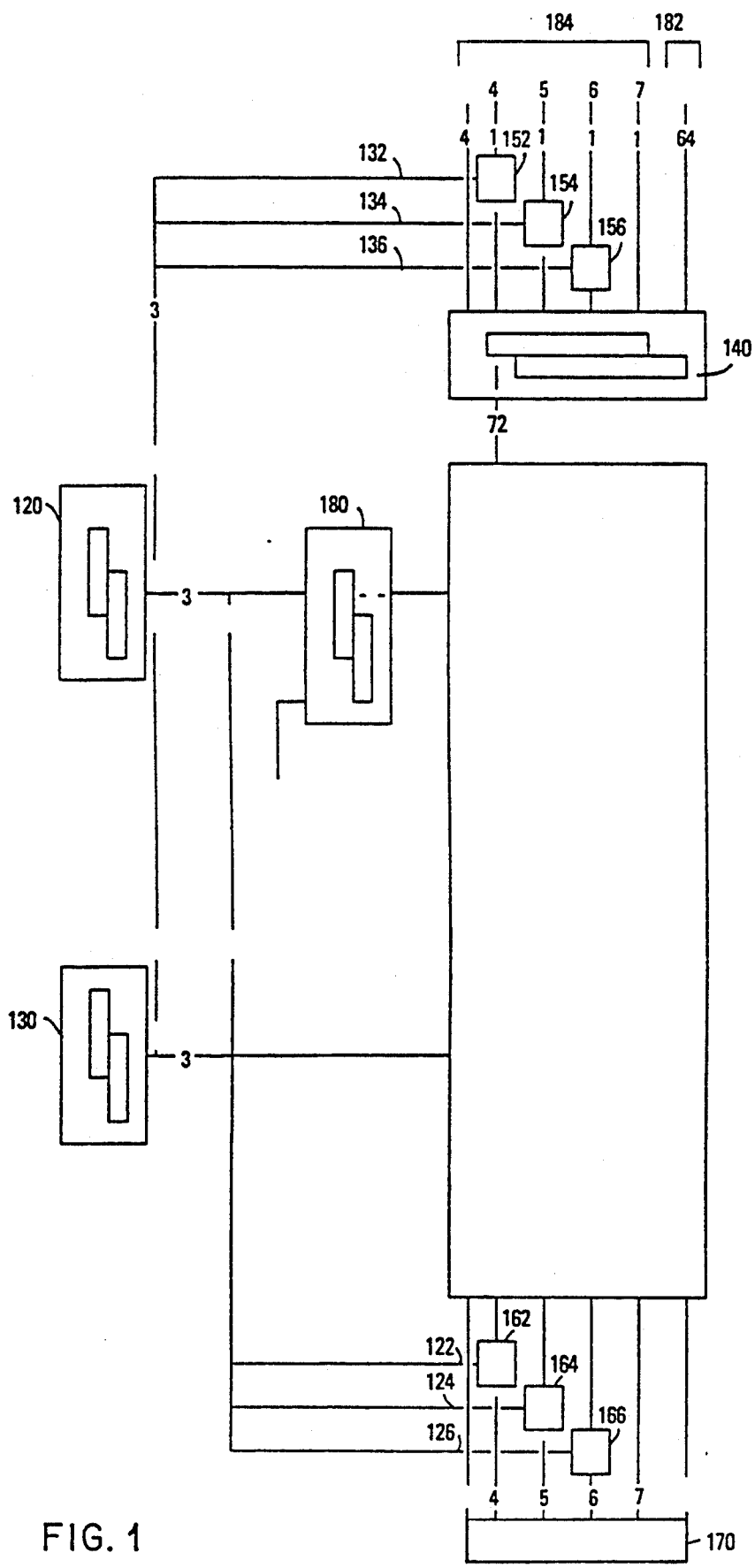
FIG. 1 shows one embodiment of the invention in its basic form.

FIG. 1 shows a memory array (110). Data is written into the array at a location given by write address counter (120) using a series of master-slave latches (140) operating in parallel. Data is read out of the array from the address given by the read address counter (130). After reading out, the parity of the data is checked using parity checker (170). The figure further shows six XOR gates (152, 154, 156, 162, 164, 166) and a buffer (180) for temporarily storing the write address. Their operation will be described later. It should be noted that the number of XOR gates can vary depending on the number of bits in the address.

The operation of the invention will be described using an 8×72 bit array. The principles of the invention can, however, apply to any suitably configured array. The data word to be read into the array consists of 64 data bits (182) and eight parity bits (184). The write path consists of the write address counter (120) and a four bit address register together with master outputs including the write enable signal. The write address counter operates with three bits which are labelled ADV_WR_CHE_ADDR(0), ADV_WR_CHE_ADDR(1) and ADV_WR_CHE_ADDR(2). The read path only contains the address counter (130) which should work in parallel with that of the write path.

Figure 2:
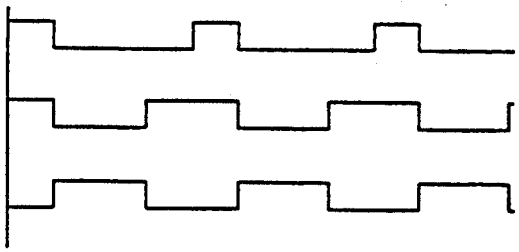
FIG. 2 is a timing diagram for the read and write operations.
Figure 2:
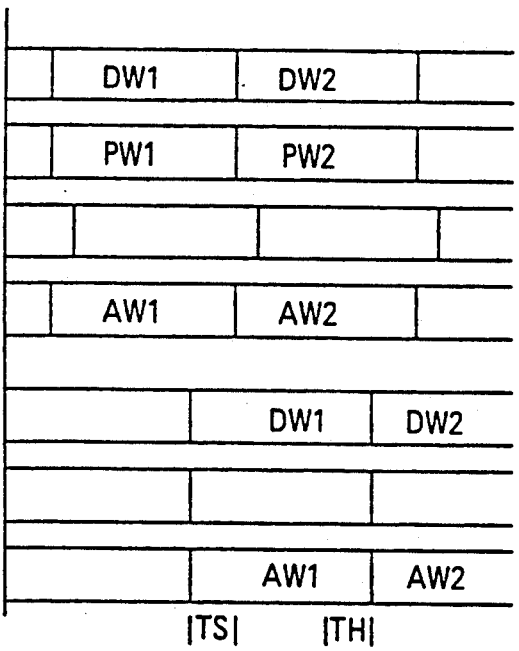
Figure 2:
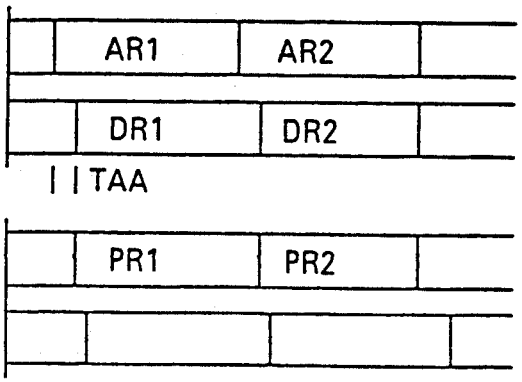

The operation of writing data into the array can be understood by considering FIGS. 1 and 2. The operation is initialized by setting the write enable signal (not shown) active. At time t1, the address to which the data is to be written (AW1) appears at the output of the read address counter (130) and the write address counter (120). The data bits of the word to be written into the array (DW1) are placed on lines 182 and the parity bits (PW1) are placed on lines 184. The three address bits, RD_CHE_ADDR(0), RD_CHE_ADDR(1), RD_CHE_ADDR(2), from the read address counter (130) are transferred to the XOR gates 152, 154 and 156 respectively. The other inputs to the XOR gates (152, 154, 156) are any three of the bits of the data word. In this example, the bits chosen are parity bits 4, 5 and 6 (DATA_IN_P(4), DATA_IN_P(5), DATA_IN_P(6)) of the word (PW1), however, any of the bits (parity or data) of the data word could have been chosen. The XOR operation slightly delays the signal (line 24 of FIG. 2) until at time t2, the modified parity bits appear at the output of the XOR gates (152, 154, 156) from where they can be read into the series of master-slave latches (140). At time t5, the address is read into the master latch of the address buffer (180) and at time t6 it appears at the slave latch of the address buffer (180). The delay between t5 and active array clock is known as the address set-up time and is labelled TS on FIG. 2 (line 32). Between time t6 and t9, the data bits (DW1) and modified parity bits (PW1 modified) are written in parallel into the array (110) from the master-slave latches 140. At time t6, a new data word (DW2, PW2) will appear on lines 184 and 182 and a new address (AW2) will appear at the output of the read address counter (130). The operation of modifying the parity bits in the XOR gates 152, 154 and 156 can proceed whilst the previous word (DW1, PW1 modified) is being written into the array (110).

The read operation begins at time t1 when the read address (AR1) appears at the output of the read address counter (130) and at the output of write address counter (120). After a short delay, the data bits (DR1) and the parity bits (PR1) of the data word at the selected address are read out. This delay is known as the read address access time and is labelled in line 52 of FIG. 2 as TAA. The parity bits 4, 5, 6 (DATA_OUT_P(4), DATA_OUT_P(5), DATA_OUT_P(6)) are passed to the XOR gates 162, 164 and 166. The other inputs to these XOR gates (162, 164, 166) are the bits ADV_WR_CHE_ADDR(0), ADV_WR_CHE_ADDR(1) and ADV_WR_CHE_ADDR(2) of the write address counter (120) which are passed along connections 122, 124 and 126. The XOR operation slightly delays the signal and at time t3 the XORed parity bits (PR1 modified) are output (line 56 of FIG. 2). Since the read and write address counters run in parallel and the parity bits on read have been XORed with the bit from the write counter corresponding to the bit from the read address counter with which it was XORed on read in, parity bits 4, 5 and 6 should have their original value restored. An example will serve to illustrate this. Suppose parity bit 4 is '1' before passing through XOR gate 152. At this gate it is XORed with RD_CHE_ADDR(0) which is 1, the result therefore being 0. This is stored in the array as bit 4 of the word. On reading out, bit 4 passes to gate 162 and is there XORed with ADV_WR_CHE_ADDR(0) which has the same value as RD_CHE_ADDR(0), i.e. 1. The truth table for the XOR operation tells us that parity bit 4 will then have its original value of 1 restored. The data can then be passed into a parity checker (170) to check the overall parity of the data. If a parity error is detected, this could be due to several reasons. Firstly one of the bits in the data may have been accidentally changed in the array or secondly the addresses indicated by the read and write address counters may not be the same in which case data may have either been stored in the wrong location or read out from the wrong location. Appropriate measures have then to be taken to correct this error.

Figure 3:
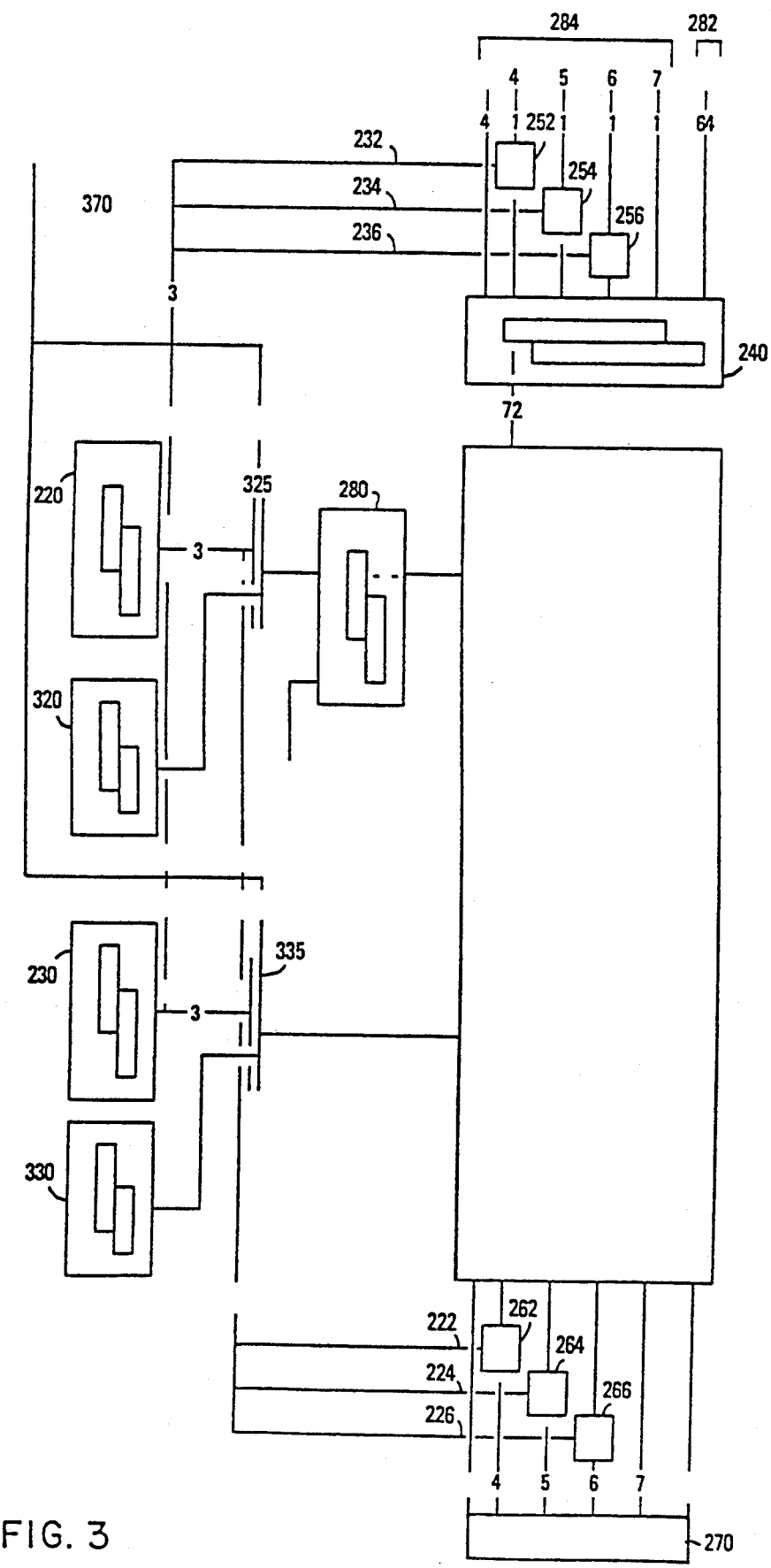
FIG. 3 shows a further embodiment of the invention which incorporates a second pair of address counters to allow the array to operate at both system and channel speeds.

A further embodiment of the invention is shown in FIG. 3. In this example a number of the components of the circuit are the same as those shown in FIG. 1 with their reference numbers differing by 100. FIG. 3 additionally includes a second write address counter (320) and a second read address counter (330) and two multiplexers (325, 335). These second counters allow the operation of the memory array at two different speeds. The first pair of counters (220, 230), for example, can operate at the Channel (CHE) speed whilst the second pair (320, 330) operate at the system (SYS) speed. The two multiplexers (325, 335) are provided to select either address counter for writing data into or reading data out of the array. Operation of this embodiment is similar to that described with reference to FIG. 1. However, in this case both the write and read paths further include a multiplexer operational command (370) to select which write address counter (220, 320) or read address counter (230, 330) is to be used.

Having thus described our invention, what we claim as new and desire to secure by Letters Patent is:

1. An apparatus for checking the address and contents of a memory array comprising
   at least one write address counter;
   at least one read address counter which operates in parallel to said write address counter;
   a latch arrangement for writing data into the said memory array;
   first gates to XOR the bits of the said read address counter with bits of a data word read into the said memory array;
   second gates to XOR the bits of the said write address counter with the bits of the said data word as it is read out of the said memory array; and
   a parity checker situated after said second gates to check the parity of the said data word.

2. An apparatus for checking the address and contents of a memory array as defined in claim 1, further comprising
   there are three first gates;
   three second gates; and
   the said read and write address counters operate with a selected set of bits.

3. An apparatus for checking the address and contents of a memory array as defined in claim 1, further comprising
   the said first gates and the said second gates XOR the bits of the address with different parity bits of the data word stored in the array.

4. An apparatus for checking the address and contents of a memory array as defined in claim 1, further comprising:
   two write address counters, one operating at the system speed and one operating at channel speed;
   a first multiplexer to select which of the said write address counters is used to write data into said array;
   two read address counters, one operating at the system speed and one operating at channel speed; and
   a second multiplexer to select which of the said read address counters is used to read data from said array.

5. An apparatus for checking the address and contents of a memory array as defined in claim 1, further comprising:
- a buffer situated between the write address counters and the array.

6. A method for checking the address and contents in a memory array, comprising:
- XORing bits of a data word with bits of a first address counter for writing the data into the said array;
- XORing the same bits of the said data word with the same bits of a second address counter on reading the data out of the array; and
- checking to see whether the parity of the said data word is correct after being read out.

7. A method for checking the address and contents in a memory array according to claim 6 further comprising
- the said bits of the data word are three parity bits of the data word.

8. A method for checking the address and contents in a memory array according to claim 6, further comprising
- the said first address counter is also used as a read address counter 9. A method for checking the address and contents in a memory array as defined in claim 6, further comprising:
- the said second address counter is also used as a write address counter.

* * * * *